Figure 4:
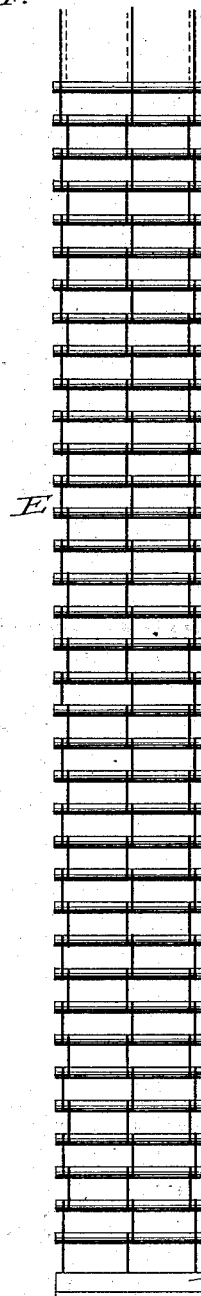

(No Model.) 2 Sheets—Sheet 1.
F. STEINEBACH & H. WRIGHT.
FIRE ESCAPE.
No. 326,169. Patented Sept. 15, 1885.
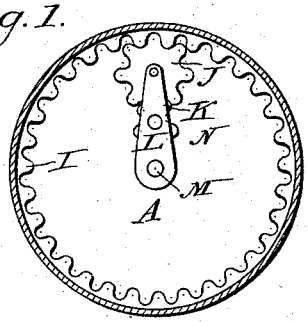
Fig. 1.
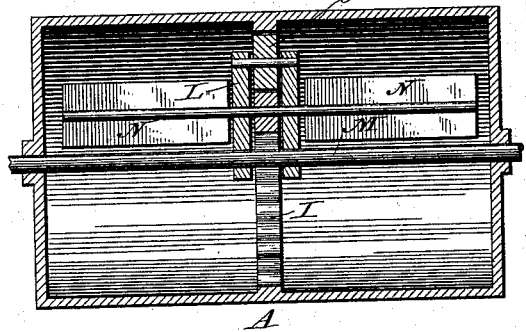
Fig. 2.
Fig. 3.
Witnesses:
Robt. M. Fryer
I. J. Fryer
Inventors.
Fredrick Steinebach
Herman Wright (No Model.) 2 Sheets—Sheet 2.

F. STEINEBACH & H. WRIGHT.
FIRE ESCAPE.

No. 326,169. Patented Sept. 15, 1885.

Witnesses:
Robt. M. Fryer
I. J. Fryer

Inventors:
Fredrick Steinebach
Herman Wright

UNITED STATES PATENT OFFICE.

FREDRICK STEINEBACH AND HERMAN WRIGHT, OF NEW YORK, N. Y.

FIRE-ESCAPE.

SPECIFICATION forming part of Letters Patent No. 326,169, dated September 15, 1885.

Application filed January 19, 1885. (No model.)

*To all whom it may concern:*

Be it known that we, FREDRICK STEINEBACH and HERMAN WRIGHT, residents of the city, county, and State of New York, and citizens of the United States, have jointly invented certain new and useful Improvements in Fire-Escapes, of which the following is a specification, having reference to the accompanying drawings forming a part hereof.

The object of this invention is to produce a fire-escape which, until brought into requisition as such, is not visible upon a building, and which can be thrown into position through its own gravity by the pressure of a few ounces upon an electric key or any suitable mechanical device from within or without the building at various points.

The invention consists, first, in the construction of a rolling or folding ladder or other escaping device, which is located at the cornice or other ornamental structure at the top of a building, either at the front, rear, side, or all, according to the style and requirements thereof. This ladder, or its equivalent, is so sustained that, when liberated, as by unlocking an escapement or release of overbalanced friction through the medium of electricity or mechanical means, the said ladder unrolls, and thereby the bottom reaches the street or sidewalk, and this end being sufficiently weighted and supported, as hereinafter set forth, a ladder is provided in front of a line of windows which enables any person to walk down while bracing the back against the outer wall of the building. Together with this device is a basket or bag, formed of asbestus or other fire-proof material, connected with a fire-proof rope or cable, which passes over the top round of the ladder or roller provided thereon. The two ends of this rope unite at the end of the ladder—one with the said basket or bag and the other at the front of the ladder—so that both can be reached when the said ladder is uncoiled, the object here being to provide means for raising the bag or basket to a window to receive such persons as could not safely make the descent by the use of a ladder, and also to save valuable articles which would be injured by being thrown to the ground.

In order, however, to render our invention fully understood, that its novelty and usefulness may be readily observed, we will proceed at once with the general description, having reference to the accompanying drawings, in which—

Figure 5:
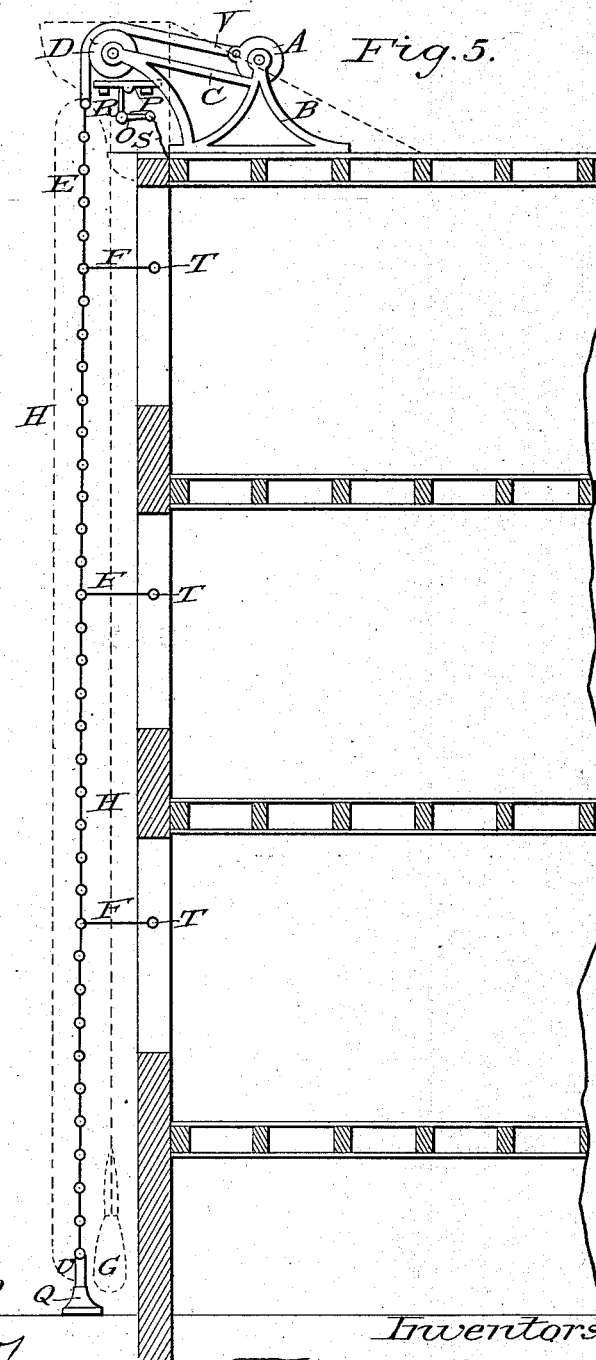

Figure 1 represents a transverse section of the drum A, upon which the ladder E is wound. Fig. 2 is longitudinal section of the same. Fig. 3 shows the drum A in place, being mounted in a frame, B, having an overhanging branch, C, which supports a secondary drum, D, over which the ladder E passes, and is held in line a proper distance from the front of the house to which the apparatus is attached, the cornice being shown in dotted lines W. Fig. 4 represents a portion of the ladder E, which is preferably composed of three flexible supports, one at each side and one in the middle, this design being to admit of small rounds, while the ladder can be made wide enough for an ordinary window, by which means a support can be had from vibrating hooks, which we have arranged in the window-frames and indicated by the letter F. Fig. 5 represents the ladder E when unwound and ready for use. Here it will be seen that the hooks F are adjusted to the rounds of the ladder, while the basket or bag above referred to and marked G, with the supporting-rope, marked H, are shown in dotted lines.

Now, in Fig. 1 it will be seen that the drum A is provided on its inner wall with a gear-wheel, I, which works in connection with a spur-wheel, J, which in turn connects with pinion K. The wheels J and K are supported by shafts, which are sustained by arms L attached to shaft M, this shaft being stationary while the drum A revolves around it. The said shaft is supported by the frame B, as shown. The shaft of pinion K is provided at each end with a fan or fans, N, the object here being to retard the motion of the drum A while the ladder is being unwound; and it will be here observed that while the ladder grows heavier the reel grows smaller, so that the velocity of the ladder's descent is nearly the same during its adjustment.

In Fig. 3 we show a bell-crank, O, the upper arm of which unites with a sliding bar, P, which is supported underneath the weight Q by guides R, while the other arm of said bell-crank is connected with a wire or rod, S, which leads with its branches to the various rooms at the front of the house or to any other desired point. The weight Q is attached to the flexible end U of the ladder, as shown, and is sufficient, when liberated, to revolve the drum by the tension thus produced on the ladder at the other flexible end, V, thereof, and so the foot of said ladder is permitted to reach the ground, as shown in Fig. 5. Here it will be seen that the hooks F are connected with the ladder, the same being easily accomplished when first secured to the window-frame at fulcrum T.

We are aware that many changes may be made in the construction of this apparatus without departing from the spirit of our invention. Therefore—

What we claim, and desire to secure by Letters Patent of the United States, is—

1. In combination with the flexible ladder E, a hollow cylindrical drum to revolve around a stationary shaft held in a suitable frame, the said drum being provided inside with a fan or fans supported by the said shaft, as shown, whereby the said fan or fans are revolved by the rotation of the drum by means of suitable gearing, substantially as described, for the purpose of retarding the descent or unreeling of the ladder, as set forth.

2. In combination with the flexible ladder E, a fire-proof flexible rope or cable provided with a fire-proof basket or bag at one end, while the other end is left free for operating the same, the said rope or cable to be supported at or near the top round of the ladder and adapted to be rolled or reeled up with the said ladder, substantially as shown and described, for the purpose set forth.

3. In a fire-escape, the combination of the flexible ladder E with the hollow drum A, provided inside with revolving fans N, all being supported by frame B, provided with overhanging-branch C and sustaining-drum D, all as arranged and described, for the purpose set forth.

4. In a fire-escape, the combination, with a flexible ladder, E, of auxiliary weight Q and releasing-bar P, operated by bell crank O, and cord or rod R, all as arranged, for the purpose set forth.

In testimony whereof we affix our signatures in presence of two witnesses.

FREDRICK STEINEBACH.
HERMAN WRIGHT.

Witnesses:
ROBT. M. FRYER,
I. J. FRYER.